(No Model.)
E. CARDARELLI.
HAND TRUCK.
No. 507,106. Patented Oct. 24, 1893.
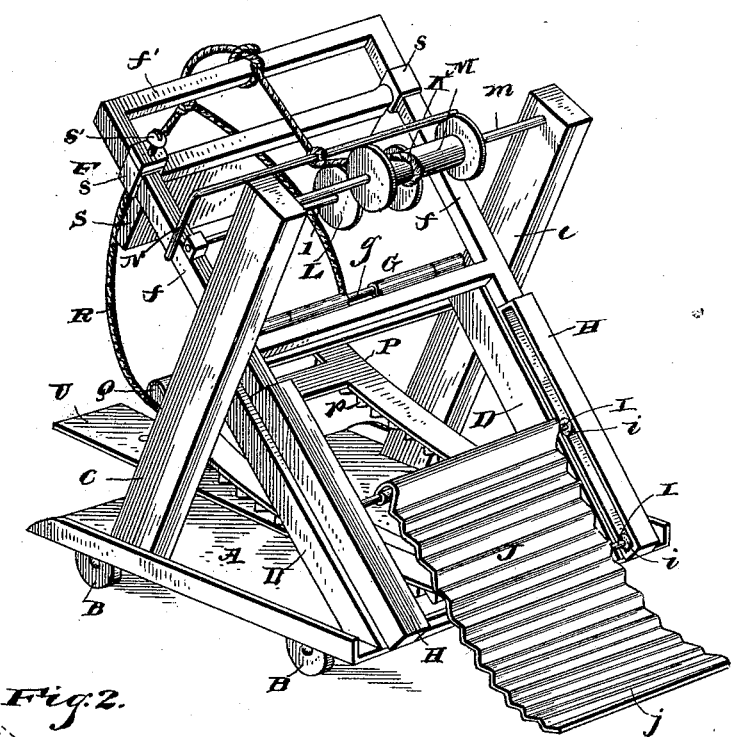
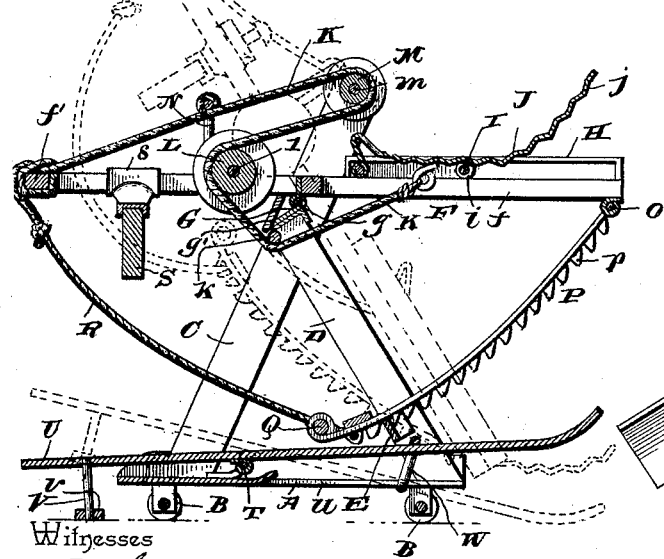
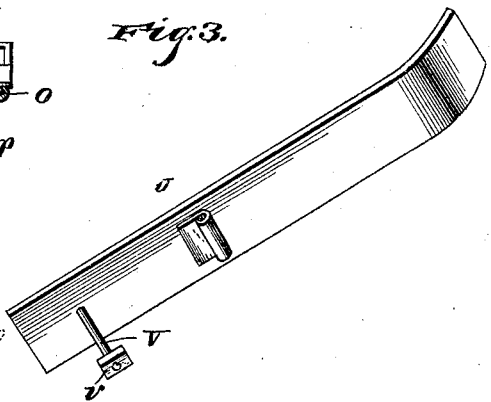

ary frame, are the op-
UNITED STATES PATENT OFFICE.

EMILIO CARDARELLI, OF SUMTER, SOUTH CAROLINA, ASSIGNOR OF ONE-HALF TO GEORGE W. DICK, OF SAME PLACE.

HAND-TRUCK.

SPECIFICATION forming part of Letters Patent No. 507,106, dated October 24, 1893.

Application filed November 30, 1892. Serial No. 453,676. (No model.)

*To all whom it may concern:*

Be it known that I, EMILIO CARDARELLI, a citizen of the United States, residing at Sumter, in the county of Sumter and State of South Carolina, have invented a new and useful Hand-Truck, of which the following is a specification.

This invention relates to hand trucks; and it has for its object to provide certain improvements in devices or machines of this character whereby the transfer of goods and heavy objects from point to point is greatly facilitated.

To this end the invention primarily contemplates an improved hand truck, having certain improvements whereby barrels or other heavy objects can be readily lifted from the floor or ground and carried any distance desired, said objects being lifted by the truck the height of the truck itself from the ground, so that the same can be used for loading the objects which it lifts into cars, wagons, &c., or taking goods therefrom.

With these and many other objects in view which will readily appear as the nature of the invention is better understood, the same consists in the novel construction, combination and arrangement of parts, hereinafter more fully described, illustrated and claimed.

In the accompanying drawings:—Figure 1 is a perspective view of a hand truck constructed in accordance with my invention shown in its lowered position for receiving an object. Fig. 2 is a vertical central longitudinal sectional view of the same. Fig. 3 is a detail in perspective of the foot-lever.

Referring to the accompanying drawings:— A represents the truck platform mounted on the wheels or rollers B, to provide for the moving of the truck from point to point. Arising from the truck platform A, are the opposite standards or uprights C, which are braced firmly in position by means of the opposite short inclined brace bars D, which bars are connected near their lower ends above the platform A, by the transverse catch bar E, the function of which will presently appear. Arranged to oscillate between the opposite uprights C, is the rectangular lifting frame, F. The rectangular lifting frame F, comprises the opposite parallel side bars $f$, connected at their ends by the end bars $f'$, and said frame is pivoted or hinged at its center at G, on the hinge or pivot rod $g$, connecting the opposite standards or uprights. A transverse stop bar $g'$, connects the standards C, at one side adjacent to the rod $g$, so as to allow only one end of the frame to drop to the ground or floor and to check the frame after reaching its horizontal position.

Secured to the dropping ends of the side bars $f$, of the rectangular frame, are the opposite slotted guides H, which receive the opposite ends of the transverse sliding lifting table or board bars I, to which is fixedly secured a lifting and supporting table J, having a curved lower end $j$, which when the lifting end of the rectangular frame is lowered, is designed to be approximately in line with the floor or ground on which the object rests, so that the said lifting table or board can be easily shoved under the object in order that it may be readily placed thereon. To the opposite ends of the sliding bars I, are secured anti-friction rollers $i$, which work in the guides so as to overcome undue friction.

Secured to the inner uncurved end of the lifting table or board is the table adjusting cord or wire K, which passes from its point of connection to the table or board, under a suitably arranged anti-friction roller $k$, below the point or pivot of the lifting frame, over the flanged guide wheel L, mounted on a transverse rod or shaft $l$, connecting the side bars of the lifting frame near its point of pivot. The adjusting cord or wire passes from the flanged guide wheel L, and thence completely around an adjacent guide wheel or roller M, which latter is mounted on a transverse rod or shaft $m$, connected to the upper ends of the opposite standards or uprights C. From the wheel or roller M, the cord or wire K, passes to an attachment bar or wire N, to which such end of the wire or rope is made fast. Now it will be readily seen that when the lifting end of the frame F, is lowered, the weight of the lifting table or board will carry it to the ground or floor, in which position it receives the article to be lifted or transported. It will be noted that in this position the wheel L, is drawn near to the wheel or roller M, so as to allow the rope or wire to slack sufficiently to let the table or board down. The object having been placed on the table or board the lifting frame is brought to a horizontal position by grasping the elevated end. This movement carries the wheel L, away from the wheel or roller M, consequently tightening the cord or wire $k$, and drawing the table or board near to the point of pivot of the lifting frame as clearly illustrated in Fig. 2 so that the weight carried by the truck will be disposed quite near to the center of the same.

Hinged at one end as at O, to the lifting or dropping end of the lifting frame, is the weighted ratchet locking frame P, having the opposite ratchet tooth bars or side pieces $p$ which are adapted to freely slide over the transverse catch bar E, when the lifting end of the frame is lifted, and to catch in said catch bar after the frame has been brought to its horizontal position for transporting the goods. A weight Q, connects the lower free ends of the tooth bars or side pieces $p$, so that the same are normally held into engagement with the transverse catch bar. When the lifting frame is tilted in position as shown in Fig. 1, it is simply necessary for the operator to grasp the high end of the frame and bear down on the same. This causes the ratchet locking frame to travel freely over the catch bar until the frame reaches the horizontal position shown in Fig. 2, and any tendency of the lifting end of said frame to drop is overcome by the engagement of said ratchet frame with said catch bar. To lower the lifting end of the lifting frame to the ground, the hinged locking frame P, is lifted out of engagement with the catch bar by means of the lifting cord R, connected to the weighted end of said frame at one end and at the other end to a suitable point of attachment so that it can be conveniently grasped.

In order to assist in raising the heavy object on the lifting end of the frame, I employ a sliding adjustable balance weight S having at opposite ends the sleeve or collars, moving over the opposite side bars of the lifting frame and one of which receives the adjustment screw $s'$, passing therethrough and bearing on one of said side bars to hold the balance weight stationary when adjusted. By means of this weight the lifting of weights on one end of the lifting frame is greatly eased.

Pivotally mounted at T, on the platform A, is the foot lever U, one end of which works in and above the slot $u$, formed in the platform A, in front of the point of pivot of said foot-lever, the other end of the lever projecting in rear of the platform for the operator to place his foot thereon. The long front end of the lever normally lies under the lifting end of the lifting frame when the same is lowered to the ground or floor, as illustrated in dotted lines in Fig. 2. The foot end of the lever is provided with a depending check or stop pin V having a friction block $v$, at its lower end, which is designed to hold the truck stationary on slippery floors or pavements.

With the lifting frame in position shown in Fig. 1, after the object has been placed on the lifting table or board, the operator bears down on the rear end of the foot-lever. This movement throws the stop pin V, onto the ground or floor to hold the truck stationary, while at the same time the long end of the lever bears under the lifting end of the lifting frame and gives it a starting lift, so that the operator by grasping the other end of the frame at the same time can easily bring it with its weight to a horizontal position so that it can readily be carried from place to place. A stop loop W, embraces the front end of the lever U, and limits the movement of the same.

Changes in the form, proportion and the minor details of construction may be resorted to without departing from the principle or sacrificing any of the advantages of this invention.

Having thus described my invention, what I claim, and desire to secure by Letters Patent, is—

1. In a hand truck, the truck platform, a lifting frame pivotally mounted on the platform and having guides at one end, a lifting table or board arranged to slide in said guides on one end of the lifting frame, an adjusting device for the sliding lifting table or board, and means for locking the lifting frame in a horizontal position, substantially as set forth.

2. In a hand truck, a tilting rectangular frame having opposite guides at one end, a sliding lifting table or board having an outer curved end and supporting bars moving in said guides, suitably arranged guide wheels or rollers, and an adjusting cord or wire passing around said guide wheels or rollers and connected at one end to the lifting frame and at its other end to one end of the sliding lifting table or board, substantially as set forth.

3. In a hand truck, the truck platform, the opposite braced standards or uprights, a rectangular lifting frame pivoted between said standards or uprights and carrying a guide wheel or roller at one side of its pivot and having opposite guides at the other side of its pivot, a sliding lifting table or board guided in said guides, a guide wheel or roller supported in a fixed position above the lifting frame, and an adjusting cord or wire connected at one end to the inner end of the sliding table or board, passed under and around the wheel or roller on the lifting frame, around the fixed wheel or roller above the lifting frame and connected at its other end to the lifting frame adjacent to the wheel or roller carried thereby, substantially as set forth.

4. In a hand truck, the truck platform, the opposite standards arising from the platform, the rectangular lifting frame pivotally mounted between said standards, a transverse stop bar connecting said standards adjacent to the pivot of the frame to stop the lifting frame in one direction, an automatically operating lifting table or board arranged to slide on one end of the lifting frame and having an outer curved end, an adjusting cord or wire passing over suitably arranged guide wheels or rollers and connected at one end to the inner end of said lifting table or board, and at its other end to the lifting frame, an adjustable balancing weight arranged to be adjusted on the lifting frame at one end, and means for locking the lifting frame in and releasing it from a fixed position, substantially as set forth.

5. In a hand truck, the truck platform, a lifting frame pivotally mounted on said platform and having a sliding lifting table or board on one end, an adjustable balancing weight arranged to work over the other end of the frame, and means for locking the frame in a horizontal position, substantially as set forth.

6. In a hand truck, the truck platform, the standards, the inclined braces connected to said standards and the platform, a transverse catch bar connecting said standards, a lifting frame pivotally mounted between said standards, a weighted ratchet locking frame hinged at one end to the lifting end of the lifting frame and engaging said catch bar, and a lifting cord connected to the weighted end of the ratchet locking frame to lift the same out of engagement with the catch bar, substantially as set forth.

7. In a hand truck, the truck platform, the standards, a transverse catch bar arranged above the platform, a tilting lifting frame pivotally mounted between the standards and having a lifting table or board, a weighted ratchet locking frame hinged at one end to the lifting end of the lifting frame and having opposite rows of ratchet teeth engaging said catch bar, a lifting cord connected to the weighted end of the ratchet locking frame, and a foot lever hinged to the platform and provided with a check or stop pin at one end, substantially as set forth.

8. In a hand truck, the truck platform having a slot, a stop loop spanning said slot, the lifting frame pivotally supported above the platform and adapted to be tilted at one end to the ground or floor, a foot lever pivotally mounted on the truck platform and having a long lever end working in the slot of the platform under said stop loop and adapted to project under the lifting end of the frame when lowered to give the same a starting lift, and having at its rear end a depending check or stop pin provided with a friction block, to check or hold the truck stationary, substantially as set forth.

In testimony that I claim the foregoing as my own I have hereto affixed my signature in the presence of two witnesses.

EMILIO CARDARELLI.

Witnesses:
JOHN H. SIGGERS,
HORACE G. PIERSON.